Patented Dec. 26, 1950

2,535,025

UNITED STATES PATENT OFFICE 2,535,025

PROCESS OF TREATING FERRITES

Ernst Albers-Schoenberg, Metuchen, N. J., assignor to Steatite Research Corporation, Keasbey, N. J., a corporation of Delaware No Drawing. Application October 6, 1949, Serial No. 120,001

4 Claims. (Cl. 25—157)

This invention relates to a process for manufacturing molded ferromagnetic oxide products of the type known as ferrites, and to the product so produced.

Ferromagnetic oxide compounds and compositions have been recently introduced into technical use serving as cores of inductance coils and transformers. The bodies consist of about 50 mol per cent of iron oxide and 50 mol per cent of bivalent oxides such as copper, cadmium, zinc, manganese, magnesium and other oxides. Such bodies are ordinarily made by mixing the finely powdered ingredients in the proper proportions and then molding and firing the mixture.

The magnetic properties of these compounds, however, do not depend solely on the composition; the firing process is of great importance too, and it has been suggested that some protective gases be supplied during the heating and cooling period. Especially oxygen has been recommended in order to prevent oxygen losses by disassociation at high temperatures.

There are, however, some inconveniences in carrying out this method of firing. The raw pieces have to be set in the kiln carefully without touching each other, thus requiring a considerable amount of space per unit of fired material. A spaceous kiln requires a considerable amount of protective gas, and this is especially true of any continuous type of kiln such as a tunnel kiln with its two openings at the ends.

An object of this invention is to provide another way of producing ferromagnetic parts with well developed and well defined properties avoiding the use of a protective gas kiln of the above described spacious feature.

Another object of the invention is to provide a method of preparing molded ferromagnetic oxide products, having the desired magnetic properties in a rapid and efficient way.

These objects and others ancillary thereto are obtained by ceramically maturing the molded ferromagnetic oxide articles in the ordinary way with the normal atmosphere of the kiln which atmosphere consists essentially of air mixed with carbon monoxide, carbon dioxide and water vapor, and by thereafter refiring the pieces in the desired protective gas atmosphere at a temperature below the ceramic maturing temperature. In the first firing step the molded pieces may be fired along with any other ceramic pieces which are treated according to the same firing cycle. After the first firing any pieces which have become warped or otherwise damaged may be discarded or ground and used to form new molded products. Any other defects which become apparent at the end of the first firing may be removed. Thus the pieces may be ground down to close tolerances after the first firing as the said pieces are ceramically matured and will not change dimensions during the refiring process.

The second firing in the protective atmosphere is carried out at a temperature below the ceramic maturing temperature so that no special care nor apparatus is necessary to maintain the pieces separated. In fact the pieces can be stacked or piled together as desired.

Any protective gas may be employed in the second firing step. Oxygen has been disclosed as a protective gas in Patents No. 2,452,529, 2,452,530 and 2,452,531. The gas chosen, however, will depend somewhat on the type of ferrite to be treated. Oxygen, for example, is detrimental to magnetite, $FeOFe_2O_3$, and to the manganese ferrite ($MnOFe_2O_3$) as in the first compound it tends to oxidize all of the FeO to $Fe_2O_3$ and in the second compound tends to oxidize MnO to $Mn_3O_4$. Other gases that may be used include hydrogen, nitrogen, helium, neon, carbon monoxide or dioxide, nitrogen and vapors of low boiling liquids such as water. Water vapor is a preferred gas as it is cheap, easy to prepare and handle, non-inflammable, non toxic and appears to have the most desirable effects on the magnetic properties of many ferrites. The gaseous atmosphere may be maintained either below or above normal atmosphere pressure. The term "protective atmosphere" is intended to include any atmosphere which protects or improves the quality of the ferrite material under firing or refiring conditions.

The kiln for the refiring process may be a small tunnel muffle kiln or it may be an intermittently operated batch process kiln.

The time required for the second refiring treatment can be varied but ordinarily it is shorter than the time required for the first firing so here again there is a saving in the amount of protective gas required. It is possible to adjust the values of $\mu$ and Q of the products by changing the time and temperature of the refiring treatment. Thus, from the same prefired blanks, different products having the properties required for the particular use to which they are to be put can be prepared.

The molded products to be fired according to the present invention are prepared in any of the ordinary ways. One usual process is to grind the components comprising the trivalent iron oxide and the bivalent metallic oxides separately and/or together to a very fine powder, thoroughly mix, add a plasticizing agent and water and mold under high pressure. Another process suggested is to simultaneously precipitate the trivalent iron oxide and the bivalent metal oxide from a solution and then dry and mold the product. The powdered material with a small amount of liquid such as water and a small amount of plasticizer such as dextrine or gum added may be molded in any known way as by compression molding or extrusion.

When the products are ground or otherwise touched-up after the first firing step it is obviously necessary to completely cool after the first firing. Where such a grinding step is not necessary it is possible to transfer the partially cooled products directly to the kiln with the protective atmosphere.

Ferromagnetic oxide products may be ceramically matured at temperatures of 2100° F. to 2400° F. depending on the specific composition of the product. The refiring process is carried out at temperatures of 1700° F. to 2200° F. but always below the ceramic maturing temperature.

*Example I*

A body (#1) containing approximately

.06 mol of magnesium oxide
.24 mol of manganese oxide
.38 mol of zinc oxide
.32 mol of nickel oxide and
1.0 mol of trivalent iron oxide is prepared by mixing and milling 1.0% of magnesite
9.0% of manganese dioxide
13.0% of zinc oxide
10.0% of nickel oxide
67.5% of iron oxide with water to a heavy smooth slip. The slip is dried, the dry lumps are powdered and the powder plasticized with a small amount of water and dextrine. A granulation is made and parts are pressed to the shape desired in a steel die. The shaped parts are fired in a tunnel kiln at about 2300° F. After the first firing the parts are ground to the size required, if necessary and then fired a second time, running them through a small tunnel kiln at a temperature of about 2050 to 2100° F. Water vapor is blown into this oven, excluding the oxygen of the air. The initial permeability $\mu_0$ and the quality factor Q, before and after the second treatment, are shown in the first line of the following table:

|    | After the first firing | | | After the second firing | | |
|----|---|---|---|---|---|---|
|    | $\mu_0$ | Q | $1/\mu_0 Q$ | $\mu_0$ | Q | $1/\mu_0 Q$ |
| #1 | 209 | 30 | 84.10⁶ | 358 | 39 | 72.10⁶ |
| #2 | 222 | 29.5 | 153.10⁶ | 579 | 15 | 115.10⁶ |
| #3 | 188 | 74 | 72.10⁶ | 243 | 83 | 40.10⁶ |
| #4 | 188 | 74 | 72.10⁶ | 194 | 147 | 34.10⁶ |

Sometimes the increase of $\mu_0$ is accompanied by a decrease of Q, but the value of $1/\mu_0 Q$ may still show an improvement. In other cases the improvement of Q may be more significant than the increase of $\mu_0$.

The bodies #2-#4 are made from the same oxides as #1 but the oxides are present in different proportions. They are prepared in the same way as body #1.

*Example II*

A body containing approximately

.37 mol per cent of nickel oxide
.63 mol per cent of zinc oxide and
1.0 mol of trivalent iron oxide is prepared by mixing and milling 11.5% of nickel oxide
21.5% of zinc oxide and
67.0% of iron oxide with water to a heavy smooth slip. The slip is dried, the dry lumps are powdered and the powder moistened with about 4% of water. From this powder parts are pressed to the desired shape in a steel die. The shaped products are fired in a tunnel kiln or periodical kiln at about 2350° F.

The second firing is carried out in a small tunnel or periodical kiln using oxygen as a protective gas. The temperature in this firing process is maintained at about 2080° F. The initial permeability $\mu_0$ and the quality factor Q after the first and the second firing are shown in the following table:

| After the first firing | | | After the second firing | | |
|---|---|---|---|---|---|
| $\mu_0$ | Q | $1/\mu_0 Q$ | $\mu_0$ | Q | $1/\mu_0 Q$ |
| 1,085 | 5.5 | 167.10⁶ | 1,271 | 4.2 | 185.10⁶ |

This example shows that the method of refining ferrite parts by refiring is desirable also for those bodies requiring high oxygen pressure, to develop the optimal values of permeability.

It is impossible to set forth each and every variation in the type of ferrite product that can be made according to the present invention but, it has been found that the two step process with the second refiring step being carried out in a protective atmosphere produces as good or better results than the single step process employing the same protective atmosphere in the initial firing process. In addition there is a great saving in cost due to the fact that the first firing step is done in the ordinary kiln without any additional structure for the maintaining of a particular atmosphere in the kiln and due to the fact that the final treatment in the controlled atmosphere is not wasted on products which are defective or on products which cannot be ground to the required tolerances. Furthermore, the atmosphere according to the present invention can be more accurately controlled, that is, an atmosphere that is only slightly oxidizing or only slightly reducing may be employed.

I claim:

1. In a method of manufacturing shaped ferromagnetic oxide products from trivalent ferric oxide together with at least one bivalent metallic oxide in which the said oxides are intimately mixed together, molded to form an article of the desired shape and then fired to produce a compact coherent matured product having the said desired shape, the improved firing process which comprises first ceramically maturing the shaped article by firing in a ceramic kiln in the normal atmosphere of the kiln which consists essentially of air mixed with carbon oxides and water vapor and subsequently refiring the ceramically matured product at a temperature below the ceramic maturing temperature in a protective gas atmosphere.

2. In a method of manufacturing shaped ferromagnetic oxide products from trivalent ferric oxide together with at least one bivalent metallic oxide in which the said oxides are intimately mixed together, molded to form an article of the desired shape and then fired to produce a compact coherent matured product having the said desired shape, the improved firing process which comprises, first ceramically maturing the shaped article by firing in a ceramic kiln in the normal atmospere of the kiln which consists essentially of air mixed with carbon oxides and water vapor and subsequently refiring the ceramically matured product at a temperature below the ceramic maturing temperature in the atmosphere of an oxidizing gas.

3. In a method of manufacturing shaped ferromagnetic oxide products from trivalent ferric oxide together with at least one bivalent metallic oxide in which the said oxides are intimately mixed together, molded to form an article of the desired shape and then fired to produce a compact coherent matured product having the said desired shape, the improved firing process which comprises, first ceramically maturing the shaped article by firing in a ceramic kiln in the normal atmosphere of the kiln which consists essentially of air mixed with carbon oxides and water vapors and subsequently refiring the ceramically matured product at a temperature below the ceramic maturing temperature in an atmosphere consisting essentially of water vapor.

4. In a method of manufacturing shaped ferromagnetic oxide products from trivalent ferric oxide together with at least one bivalent metallic oxide in which the said oxides are intimately mixed together, molded to form an article in which the said oxides are intimately mixed together, molded to form an article of the desired shape and then fired to produce a compact coherent matured product having the said desired shape, the improved firing process which comprises, first ceramically maturing the shaped article by firing in a ceramic kiln in the normal atmosphere of the kiln which consists essentially of air, grinding the ceramically matured articles to the shape and tolerances required, and subsequently refiring the ceramically matured product at a temperature below the ceramic maturing temperature in a protective gas atmosphere.

ERNST ALBERS-SCHOENBERG.

No references cited.